(12) United States Patent
Presley

(10) Patent No.: US 9,533,324 B2
(45) Date of Patent: Jan. 3, 2017

(54) CONTAINER FOR SELECTIVELY DISPENSING A MATERIAL

(71) Applicant: Randolph S. Presley, Grand Haven, MI (US)

(72) Inventor: Randolph S. Presley, Grand Haven, MI (US)

(*) Notice: Subject to any disclaimer, the term of this patent is extended or adjusted under 35 U.S.C. 154(b) by 360 days.

(21) Appl. No.: 14/203,882

(22) Filed: Mar. 11, 2014

(65) Prior Publication Data

US 2014/0190997 A1 Jul. 10, 2014

Related U.S. Application Data

(63) Continuation of application No. 13/539,625, filed on Jul. 2, 2012, now Pat. No. 8,701,591, which is a continuation of application No. 12/509,651, filed on Jul. 27, 2009, now abandoned.

(60) Provisional application No. 61/145,650, filed on Jan. 19, 2009, provisional application No. 61/144,215, filed on Jan. 13, 2009.

(51) Int. Cl.
| | |
|---|---|
| *B05C 3/09* | (2006.01) |
| *B05C 17/01* | (2006.01) |
| *B05C 3/109* | (2006.01) |
| *F16N 7/00* | (2006.01) |
| *A46B 11/00* | (2006.01) |
| *B65D 83/00* | (2006.01) |

(52) U.S. Cl.
CPC ............... *B05C 3/109* (2013.01); *A46B 11/00* (2013.01); *B05C 3/09* (2013.01); *B05C 17/014* (2013.01); *B65D 83/0011* (2013.01); *B65D 83/0016* (2013.01); *F16N 7/00* (2013.01)

(58) Field of Classification Search
CPC ............... B05C 3/09; B05C 3/10; B05C 3/18; B05C 3/20; B05C 17/014; B65D 83/0005–83/0016; B65D 85/24; F16N 3/00; F16N 3/10; F16N 7/00
See application file for complete search history.

(56) References Cited

U.S. PATENT DOCUMENTS 1,454,574 A * 5/1923 Bown ................. F16N 3/12
 222/390
2,487,642 A * 11/1949 De Waltoff ........ B65D 83/0016
 222/320
5,520,737 A * 5/1996 Denton ..................... B05C 3/09
 118/400

* cited by examiner

*Primary Examiner* — Dah-Wei D Yuan
*Assistant Examiner* — Stephen Kitt
(74) *Attorney, Agent, or Firm* — James E. Shultz, Jr.

(57) ABSTRACT

A dispensing container apparatus having a tubular container with a bottom end and a rotatable annular upper end connected to a tubular shaft, and a compression member associated with the tubular shaft which causes a material disposed within the containment region to communicate into the tubular shaft or into a containing area upon rotation of the rotatable annular upper end. A brush applicator removably fits into an open end of the tubular shaft for receiving paste to be dispensed via brush application. Also, the container apparatus includes a top member having paste-access holes sized and adapted to closely receive different threaded shaft sizes of fasteners. In one form, the top member is partially rotatable for closing the holes, and then further rotatable for moving the piston (and hence paste) within the container.

20 Claims, 13 Drawing Sheets

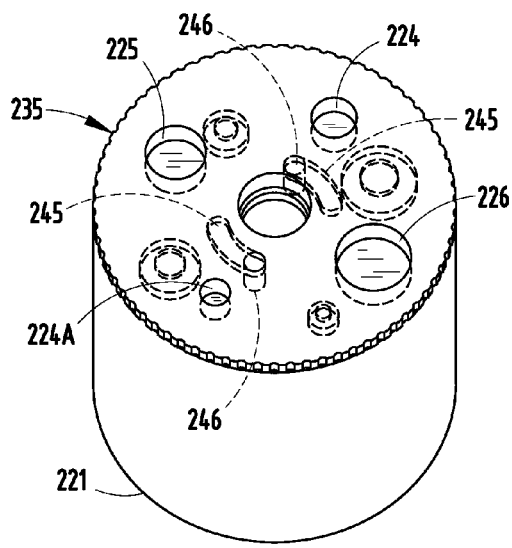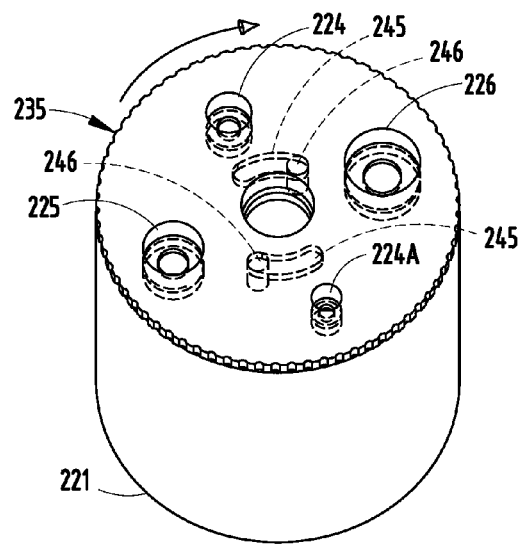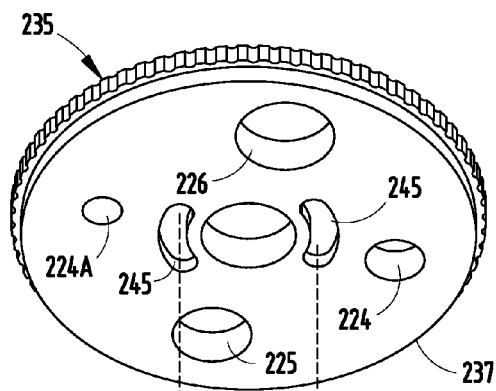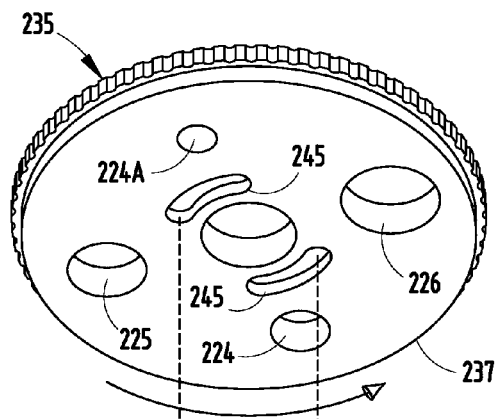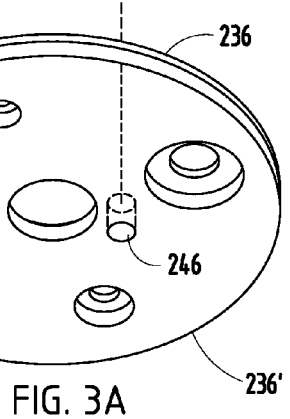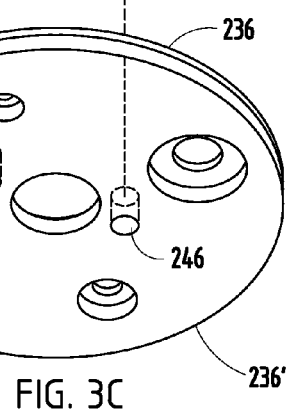

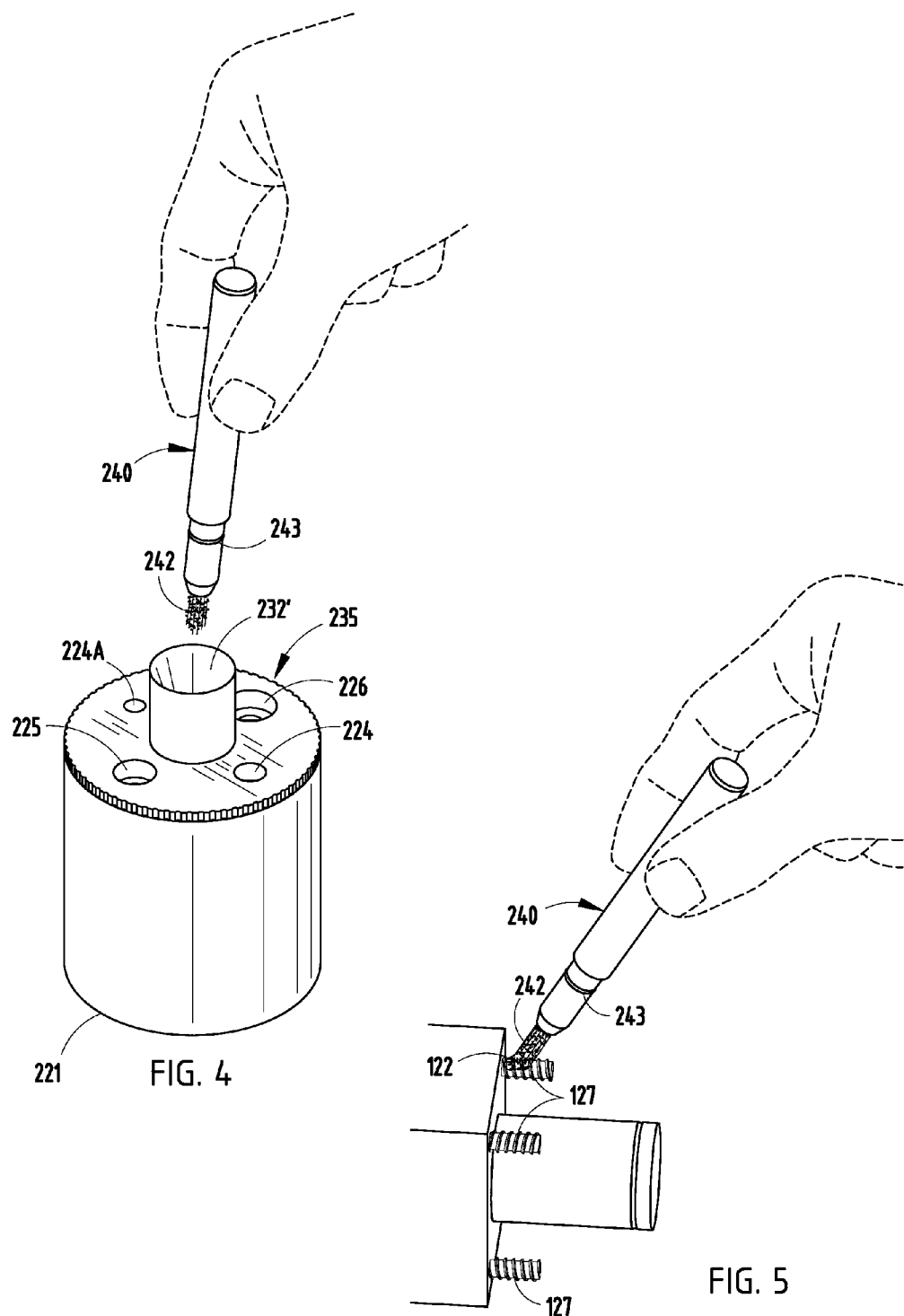

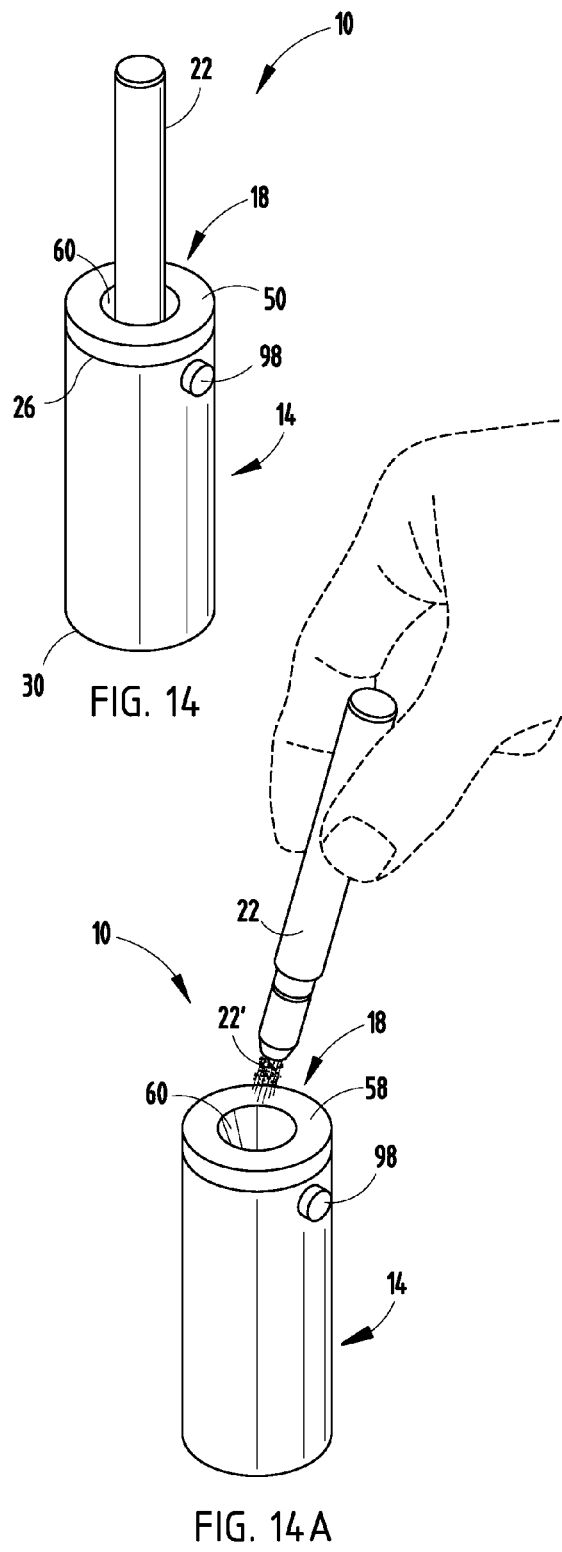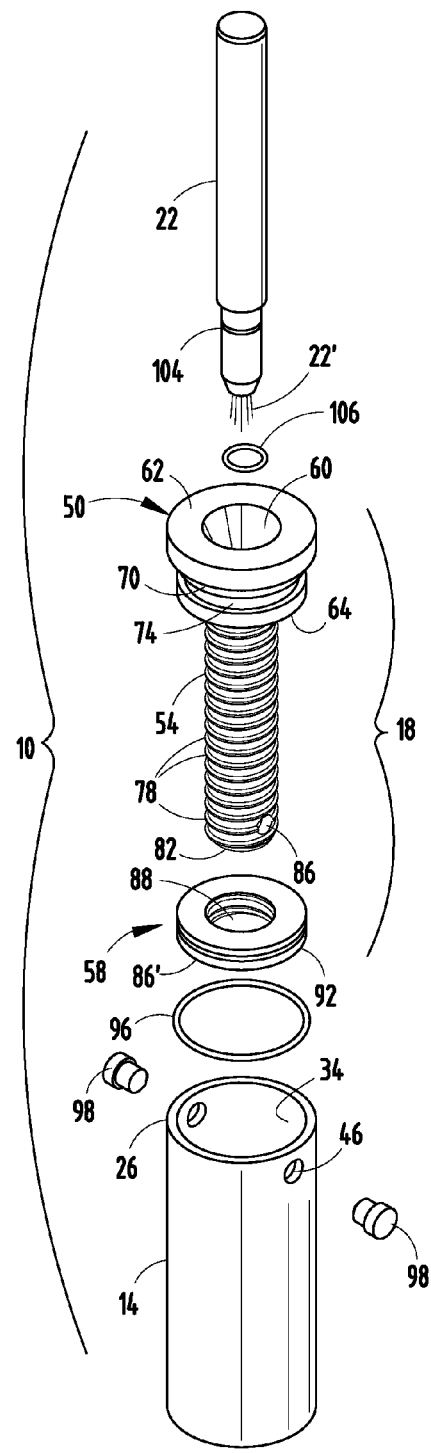
FIG. 14
FIG. 14A
FIG. 14B

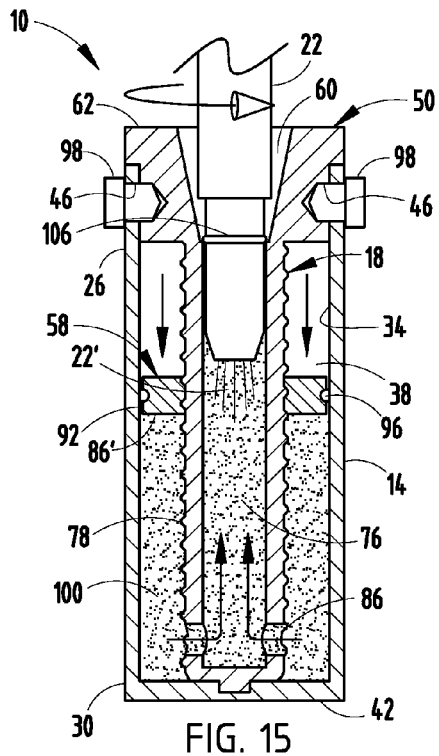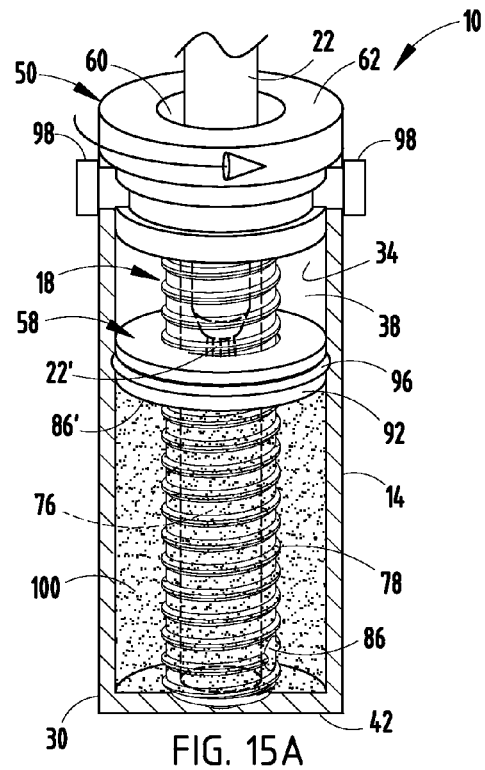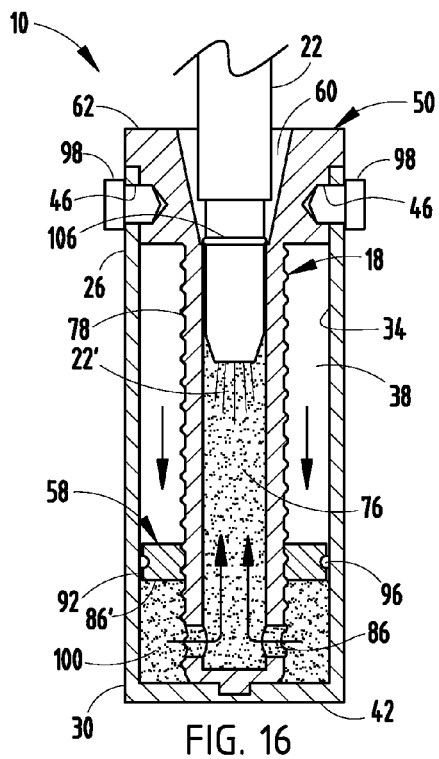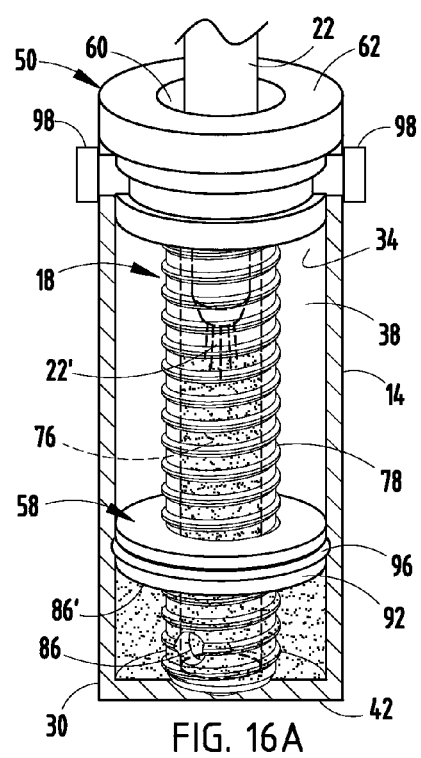

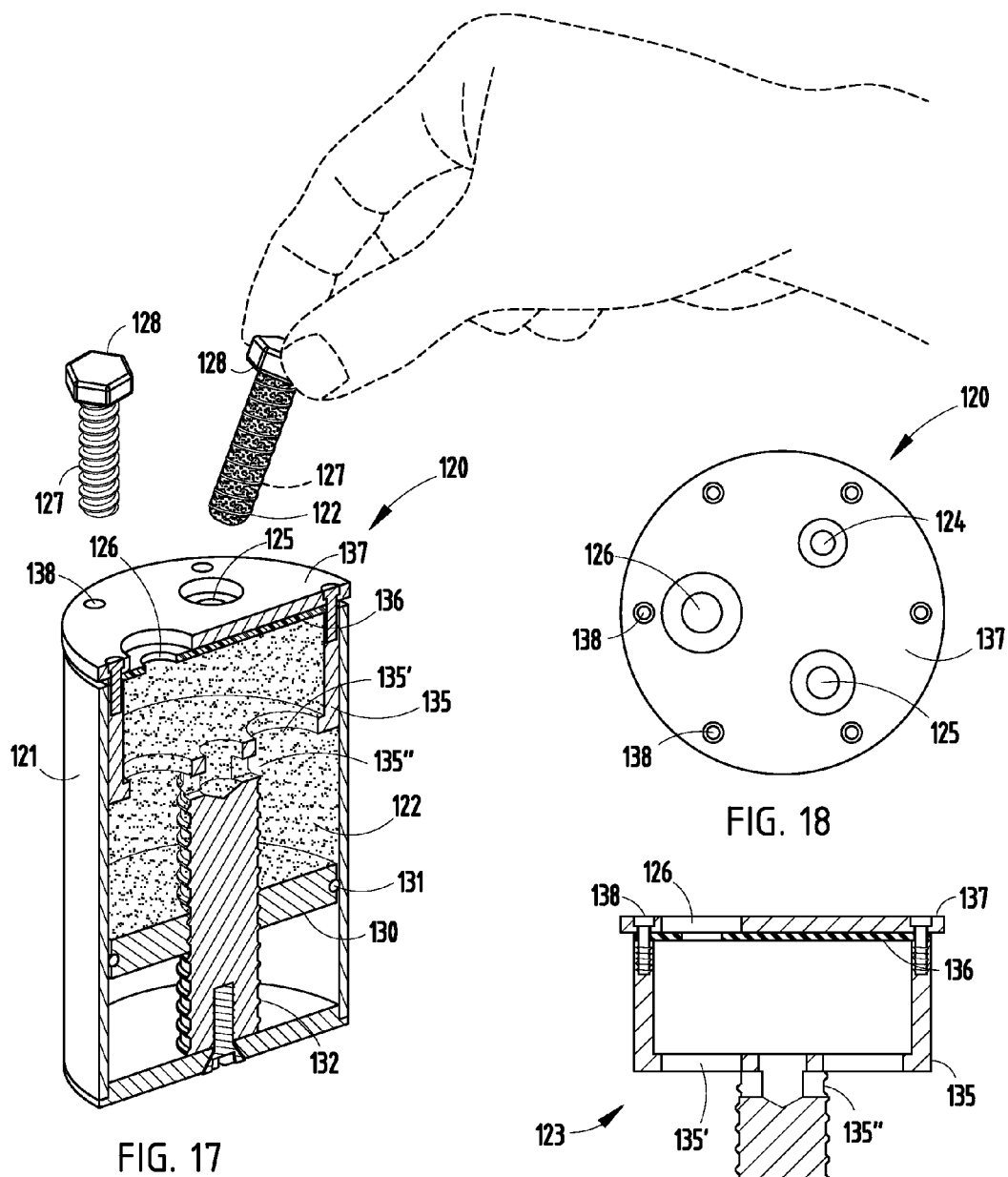

CONTAINER FOR SELECTIVELY DISPENSING A MATERIAL

CROSS REFERENCE TO RELATED APPLICATIONS

This application is a continuation of application Ser. No. 13/539,624, filed Jul. 2, 2012, entitled CONTAINER FOR SELECTIVELY DISPENSING A MATERIAL, which is a continuation of Ser. No. 12/509,651, filed Jul. 27, 2009, entitled CONTAINER FOR SELECTIVELY DISPENSING A MATERIAL, which claims benefit under 35 U.S.C. §1.119(b) of provisional application Ser. No. 61/145,650, filed Jan. 19, 2009, entitled CONTAINER FOR SELECTIVELY DISPENSING A MATERIAL, and also of provisional application Ser. No. 61/144,215, filed Jan. 13, 2009 entitled WIPING DISPENSER FOR ANTI-SEIZE PASTE, the entire contents of each of which are incorporated herein in their entirety.

BACKGROUND OF THE PRESENT INVENTION

The present invention relates in general to a container and more particularly, but not by way of limitation, to a container for selectively dispensing a contained material.

Although containers are well known in the art, conventional containers used in conjunction with highly viscous materials, for example, grease, adhesive, anti-seize compounds, and the like suffer from numerous drawbacks. Typical containers include, but are not limited to, tubes, boxes, plastic enclosures with lids and the like. Dispensing material from these conventional containers can be a messy and extremely inaccurate and wasteful process. In general, there is no way to approximate or control the amount of material dispensed from a typical container. Also, typical containers, for example tubes, are subject to leakage. As material is squeezed from the tube, excess material is often unnecessarily dispensed leading to waste. Also, material is left in the container and wasted.

Additionally, some applications require the use of a brush to apply the dispensed material. In general, the brush is not designed to cooperate with the container, so waste and mess are inevitable. In some instances, the brush is attached to the bottom side of the lid and is fully immersed within the material, and leads to over-application of the material and excessive mess. In cases where the brush is not attached to the lid, one must find a place to rest the brush when not in use. The user cannot lay the brush down without getting the dispensed material on surrounding surfaces. In the case of an adhesive, the brush may bond to the surface the brush is laid upon, ruining not only the brush, but also the surface or item the brush was laid upon.

Anti-seize compounds, grease, and lubricants (called "lubricious paste" herein) are often applied to the threaded shafts of screws, bolts, and other fasteners in order to prevent installed fasteners from seizing up over time, thus allowing easier removal at a later time. They are also sometimes used to facilitate installation of (or disassembly of) threaded (and non-threaded) shafted items. They are also used to reduce friction between any two moving parts. Historically, this has often been done by dipping the fastener's threaded portion/shaft into an open container holding the anti-seize paste, or by applying "blobs" of the anti-seize paste to the fastener's shaft using a brush or applicator. However, this results in much more of the paste being used than is actually necessary. Further, it can lead to an incredible mess, both at the installation site and also on and around the container, since any attempt to wipe off excess paste "expands" the sticky mess. It is desirable to provide a way to apply a more appropriate amount of the anti-seize paste to threaded fasteners, and to apply it only in a desired location while still completely and uniformly covering the threads/shaft. Another problem is that repairmen are not inclined to take the time (nor have the patience) to limit the amount of paste that they apply, nor be accurate in their point of application when putting anti-seize paste onto a fastener. Currently, containers and brushes for applying anti-seize compounds, grease, and lubricants are intended to be thrown away, leading to environmental concerns and a non-environmentally friendly system.

SUMMARY OF THE INVENTION

In one aspect of the present invention, a container apparatus for dispensing a lubricious paste material includes a tubular container. A top assembly covers the tubular container and includes a top member defining at least one paste-access hole, a piston for motivating paste within the container toward the top member, and a shaft member operably engaging the piston for rotation to move the piston within the container.

In another aspect of the present invention, a container apparatus includes a tubular container. A top assembly fits onto the container and includes a top member defining first and second paste-access holes, a hand-held applicator shaped to fit into the first paste-access hole, the second paste-access hole being configured and adapted to receive a shaft of a fastener for applying paste to the shaft, and a piston for motivating paste within the container toward the top member. The top assembly includes a shaft mechanism operably engaging the piston and is rotatable to move the piston and paste within the container.

In another aspect of the present invention, a dispensing apparatus includes a container with top member having a plurality of holes and adapted to hold viscous fluid. The apparatus further includes a handled applicator in one of the holes with an applicator end positioned to touch the viscous fluid. Remaining ones of the holes are shaped to closely receive a shaft end of a fastener of known size for coating the shaft end with a limited thickness of the viscous fluid.

In another aspect, the present invention is directed to a container apparatus, comprising: (a) tubular container having a bottom end, an annular upper end and an inner surface, wherein the annular upper (or lower) end is freely rotatable and comprises a tubular shaft extending downwardly therefrom providing fluid communication from the tubular container into the tubular shaft; (b) a compression member disposed within and slideably engaging the inner surface of the tubular container, wherein the compression member is selectively positionable along the tubular shaft, and wherein the compression member and the bottom end of the tubular container cooperate to define a containment region having a volume; and (c) wherein rotation of the annular upper or lower end causes the compression member to travel along the tubular shaft decreasing the volume of the containment region to cause a material disposed within the containment region to communicate into the tubular shaft.

In a narrower aspect, the compression member comprises a circumferential seal member disposed between the compression member and the inner surface of the tubular container.

In another narrow aspect, the container apparatus further comprises a brush, wherein the brush comprises a shaft having a length and a bristled end, wherein the bristled end is disposable at least partially within the tubular shaft.

In yet another narrower aspect, the brush comprises a seal member disposed on the shaft for engaging at least a portion of the tubular shaft to prevent loss of the material contained in the tubular shaft.

In an additional narrower aspect, the tubular shaft comprises one or more lateral apertures disposed on an end thereof providing fluid communication between the containment area and the tubular shaft.

In another aspect, the present invention is directed to a container apparatus, comprising: (a) a tubular container having a sealed bottom end, an open upper end and an inner surface; (b) a piston assembly comprising: (1) a cap comprising an aperture extending therethrough, the cap sealing the open upper end of the tubular container, wherein the cap is freely rotatably about the open upper end of the tubular container, and wherein the cap comprises: (i) a tubular shaft extending downwardly from and in axial alignment with the aperture of the cap into the tubular container, the tubular shaft providing fluid communication between the tubular container and the tubular shaft; and (2) a compression member disposed within and slideably engaging the inner surface of the tubular container, wherein the compression member is selectively positionable along the tubular shaft, and wherein the compression member and the sealed bottom end of the tubular container cooperate to define a containment region having a volume; and (c) wherein rotation of the annular upper or lower end causes the compression member to travel downwardly along the tubular shaft decreasing the volume of the containment region to cause a material disposed within the containment region to communicate into the tubular shaft.

In another narrower aspect, the compression member comprises a circumferential seal member disposed between the compression member and the inner surface of the tubular container.

In yet another narrower aspect, the cap comprises a collar portion configured to fit within the open upper end of the tubular container, the collar portion comprising a circumferential groove.

In an additional narrower aspect, the tubular container comprises a tab extending from the inner surface of the tubular container for engaging the circumferential groove of the cap and securing the cap to the open upper end of the tubular container and allowing for free rotation of the cap.

In another narrower aspect, the aperture of the cap is tapered from a top surface of the cap downwardly to the tubular shaft.

In another narrower aspect, the brush comprises a shaft having a length and a bristled end, wherein the bristled end is disposable at least partially within the tubular shaft via the aperture of the tubular shaft.

In yet another narrower aspect, the brush comprises a seal member disposed on the shaft for engaging at least a portion of the aperture of the shaft to prevent loss of the material contained in the tubular shaft and prevent evaporation of volatiles to the atmosphere.

In another narrower aspect, the tubular shaft comprises one or more lateral apertures providing fluid communication between the containment area and the tubular shaft.

In another narrower aspect, the present invention is directed to a container apparatus, comprising: (a) a tubular container having a sealed bottom end, an open upper end and an inner surface; (b) a piston assembly comprising: (1) a cap comprising a centrally aligned aperture extending therethrough, the cap sealing the open upper end of the tubular container, wherein the cap is freely rotatable about the open upper end of the tubular container, and wherein the cap comprises: (i) a tubular shaft extending downwardly from and in axial alignment with the aperture of the cap into the tubular container, the tubular shaft providing fluid communication between the tubular container and the tubular shaft; (c) a seal member disposed between the compression member and the inner surface of the tubular container; (d) a compression member disposed within and slideably engaging the inner surface of the tubular container, wherein the compression member is selectively positionable along the tubular shaft, and wherein the compression member and the sealed bottom end of the tubular container cooperate to define a containment region; and (e) wherein rotation of the annular upper or lower end causes the compression member to travel downwardly along the tubular shaft decreasing the volume of the containment region and causing a material disposed within the containment region to communicate into the tubular shaft.

In another aspect of the present invention, a container apparatus for dispensing a paste includes a container adapted to hold a paste and including a top and a top member for covering the top of the container. The top member has one or more paste-access holes sized and adapted to closely receive a shaft of a fastener, and a piston for moving the paste toward the top but without forcing the paste out the hole in the cover. The shaft of the fastener can be extended through the hole and be covered with the paste and, when removed, leaves a layer of paste of limited thickness on the shaft.

In another aspect of the present invention, a container apparatus for dispensing a paste onto a fastener includes a container adapted to hold a paste and including an open top, and a top member on the container including a resilient wiper with a flexible wiping edge for wiping excess material from a fastener as the fastener is removed from dipping into the paste to keep the excess material in the container. By this arrangement, the shaft of the fastener can be extended into the paste and be covered with the paste and, when removed, a layer of the paste of limited thickness is left on the shaft.

In another aspect of the present invention, a method of applying paste to a threaded shaft of a fastener comprises steps of providing a container holding paste and including an open top; and providing a top member for covering the container, the top member having a paste-access hole sized and being adapted to closely receive the threaded shaft of a fastener. The method further includes extending the threaded shaft of the fastener through the hole and into the paste to thus cover a portion of the threaded shaft with the paste, and then removing the threaded shaft such that, when removed, a layer of paste of limited thickness remains on the threaded shaft.

In another aspect of the present invention, a method of applying a paste to a shaft of a fastener comprises steps of providing a container holding paste and including a top, providing a top member for partially covering the container, the top member including a flexible wiper, and dipping the fastener into the paste through the opening and then wiping excess material from a shaft of the fastener on the wiper as the fastener is removed to thus leave a layer of paste of limited thickness remaining on the shaft.

An object is to provide a dispensing system that is more environmentally friendly by reducing waste and evaporation (pollution) and by reducing excess deposits of material at locations of use.

An object is to provide a refillable system that minimizes the amount of environmentally-unfriendly waste that must be disposed of.

These and other aspects, objects, and features of the present invention will be understood and appreciated by those skilled in the art upon studying the following specification, claims, and appended drawings.

BRIEF DESCRIPTION OF THE DRAWINGS

Certain embodiments of the present invention are illustrated by the accompanying figures, but it should be understood that the figures are not necessarily to scale and that details may be present that are not necessary for an understanding of the invention. Further, it should be understood that the invention is not necessarily limited to the particular embodiments illustrated herein.

FIGS. 1-4 are perspective views of a container apparatus embodying the present invention, FIG. 1 showing the container apparatus ready for use, FIG. 2 showing a process of coating a threaded shaft of a bolt, FIG. 3 showing the container apparatus with bolt-receiving paste-access holes closed; FIG. 4 showing removing a brush applicator from a paste-access hole of the container apparatus.

FIG. 5 is a perspective view showing the brush applicator being used.

FIG. 14 is a perspective view of a modified container apparatus and brush applicator, FIG. 14A being similar but with the brush applicator pulled out, and FIG. 14B being an exploded view of FIG. 14.

FIGS. 15 and 16 are cross-sectional views of a container apparatus showing the compression member disposed adjacently to the cap, FIG. 15 showing the container apparatus adjusted to a large containment region, and FIG. 16 showing the container apparatus adjusted to a smaller containment region, FIGS. 15A and 16A showing perspective views of FIGS. 15-16, respectively.

FIG. 17 is a perspective cross-sectional view of another modified container apparatus, the apparatus including bolt-receiving paste-access holes for coating threads on the bolt's shaft.

FIG. 18 is a top view of FIG. 17.

FIG. 19 is a side cross-sectional view of the rotatable subassembly of FIG. 17, the rotatable subassembly including the top container-defining portion and threaded vertical shaft (with the piston removed).

DESCRIPTION OF EMBODIMENTS

Figure 1:
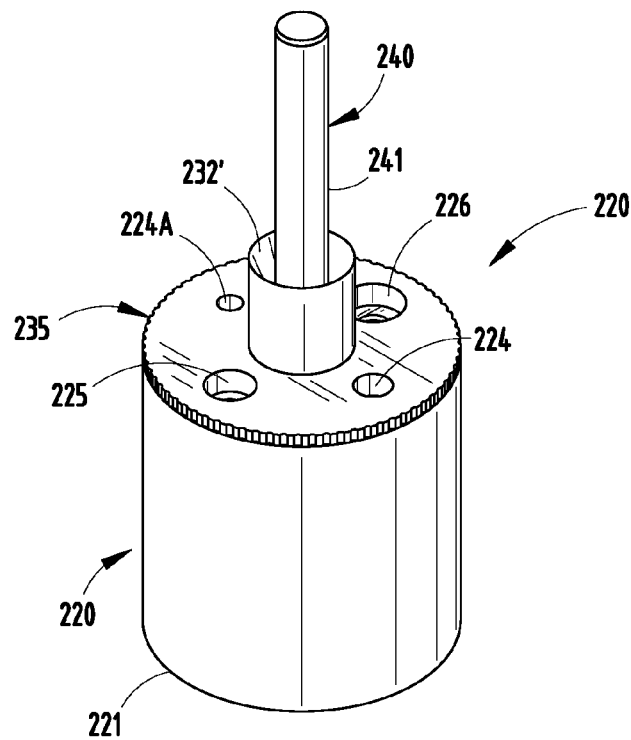

While this invention is susceptible of embodiment in many different forms, there is shown in the drawings and will herein be described in detail several specific embodiments with the understanding that the present disclosure is to be considered as an exemplification of the principles of the invention and is not intended to unnecessarily limit the invention to the embodiments illustrated. It will be understood that like or analogous elements and/or components, referred to herein, may be identified throughout the drawings with like reference characters.

The present description is organized as follows in order to provide a thorough but clear understanding of the present concepts. First discussed are FIGS. 14-16A (which disclose a brush-type container apparatus 10), and then FIGS. 17-23 (which disclose a bolt-coating-type container apparatus 120 and paste refill system), and then FIGS. 1-13 (which disclose a combination brush-and-bolt-coating container apparatus 220). Notably, several of the present concepts are interrelated, and thus it should be recognized that components and characteristics described in each of apparatus 10, 120 and 220 can be used in or incorporated into the other apparatus, as will be understood by persons skilled in this art.

Container apparatus 10 (FIGS. 14-16A) includes a tubular container 14, a piston assembly 18 and a handled applicator 22 (also called a "brush applicator" or "brush"). In general, the container apparatus 10 is provided for selectively dispensing a material contained within the tubular container 14. The illustrated tubular container 14 has a substantially uniform cylindrical cross-sectional area extending from upper end 26 to lower end 30, and defining an inner surface 34 and inner region 38. Although the tubular container 14 is shown as having a substantially uniform cylindrical cross-sectional area, it is contemplated that other cross-sectional areas could be used, such as square, triangular, or elliptical. The tubular container 14 is constructed from a strong, rigid material, for example, a resin and/or plastic polymer, a metal and/or metallic alloy, a fiberglass material, or combinations thereof. The illustrated tubular container 14 is sealed at lower end 30 with cap 42, although it will be understood that tubular container 14 and cap 42 may be fabricated integrally. Additionally, tubular container 14 is optionally provided with one or more apertures 46 fabricated into the sides of upper end 26. In accordance with the present disclosure, apertures 46 are configured to receive a fastener therethrough for securing tubular container 14 to piston assembly 18.

Piston assembly 18 (FIG. 14B) includes a cap 50, a tubular shaft 54 and a compression member 58. Cap 50 is an annular member, wherein the inside ring of the annular member defines a centrally aligned, tapering aperture 60. The annular member is constructed from a strong, rigid material, for example, a resin and/or plastic polymer, a metal and/or metallic alloy, a fiberglass material, or combinations thereof. Cap 50 includes a top surface 62 and a lower surface 64, and includes a cylindrical collar 70 having a circumferential groove 74. The cap 50 preferably includes a knurled or otherwise tacky surface fabricated onto the edge of the cap 50 to provide a non-slip gripping surface. Circumferential groove 74 is located at a distance along cylindrical collar 70 such that circumferential groove 74 may align with apertures 46 of tubular container 14. Cylindrical collar 70 is constructed to be received within upper end of tubular container 14. Cap 50 is configured such that cylindrical collar 70 joins with upper end 26 of tubular container 14 to form an enclosure.

Cap 50 (FIG. 14B) is additionally provided with tubular shaft 54 extending downwardly from lower surface 64 of cap 50 and in axial alignment with tapered aperture 60 of cap 50. Tubular shaft 54 is preferably fabricated having a substantially uniform cylindrical cross-sectional area extending along the entire length of tubular shaft 54 to define inner region 76 (FIG. 15). In accordance with the present invention, tubular shaft 54 is preferably provided with threaded outer surface 78 extending along the length of tubular shaft 54 to lower end 82 for threadably engaging compression member 58 (discussed in greater detail below). In one embodiment, lower end 82 includes one or more lateral apertures 86 fabricated into lower end 82 of tubular shaft 54 providing fluid communication between tubular container 14 and inner region 76. Lower end 78 may also include, for example, an open lower end (not shown) providing fluid communication between tubular container 14 and inner region. Although fluid communication has been disclosed as being provided by lateral apertures 86 and/or an open lower end, it is contemplated that other fluid communication members could be constructed and would be known to one of ordinary skill in the art when taken with the present disclosure.

Tubular shaft 54 (FIG. 14B) cooperating with tapered aperture 60 of cap 50 defines a fluid passage (also referred to herein as a paste-access hole) extending from top surface 62 of cap 50 to lower end 82 of tubular shaft 54 and includes tapered aperture 60 of cap 50 and the substantially uniform inner region 76 of tubular shaft 54. It will be understood that the tapered aperture 60 of cap 50 could be replaced with an aperture having a substantially uniform cross-sectional area.

Compression member 58 (also called a "piston" herein) (FIG. 14B) comprises an annular disk constructed from a strong, rigid material, for example, a resin and/or plastic polymer, a metal and/or metallic alloy, a fiberglass material, or combinations thereof. Compression member 58 includes bottom surface 86' and is provided with threaded surface 88 for interfacing with threaded outer surface 78 of tubular shaft 54. Also, compression member 58 includes a seal member, such as an O-ring or gasket, disposed about the circumference of outer surface 92 of compression member 58. In one embodiment, the seal member is provided as O-ring 96 is configured to fit within a circumferential groove fabricated into outer surface 92 of compression member 58. O-ring 96 is disposed between outer surface 92 of compression member 58 and inner surface 34 of tubular container 14 when compression member 58 is slideably inserted within tubular container 14. Although the seal member has been disclosed as comprising O-ring 96, any type of seal member which would be known to one of ordinary skill in the art with the present disclosure before them are likewise contemplated for use in accordance with the present invention.

When compression member 58 is disposed within tubular container 14, bottom surface 86 of compression member 58 and cap 42 of tubular container 14 cooperate to define containment region 100 (FIG. 15). It will be understood that the volume of containment region 100 increases as the distance between bottom surface 86 of compression member 58 and cap 42 of tubular container 14 increases, and vice versa, as will be discussed in greater detail below.

It is contemplated that the container apparatus 10 can be assembled in various manners. For example, container apparatus 10 can be assembled by first assembling piston assembly 18. Piston assembly 18 is constructed by threading compression member 58 onto tubular shaft 54 until compression member 58 is disposed near cylindrical collar 70 of cap 50 (compare the location of compression member 58 on shaft 54 in FIGS. 15-16). Tubular container 14 is then filled, at least partially, with a highly viscous material, for example, a grease or adhesive. The piston assembly 18 is engaged with tubular container 14 by slideably inserting compression member 58 into inner region 38 of tubular container 14. O-ring 96 of compression member 58 engages inner surface 34 of tubular container 14. Piston assembly 18 is further slid into tubular container 14 until cylindrical collar 70 of cap 50 is slideably inserted within upper end 26 of tubular container 14 such that circumferential groove 74 of cylindrical collar 70 of cap 50 aligns with apertures 46 of tubular container 14. Next, fasteners 98, for example, threaded bolts, are placed through apertures 46 and extend at least partially into circumferential groove 74 of cylindrical collar 70 of cap 50 to secure piston assembly 18 to tubular container 14. It will be understood that cap 50 is freely rotatable about upper end 26 of tubular container 14 when tubular container 14 and piston assembly 18 are secured together via cooperation of fasteners 98 with circumferential groove 74 of cylindrical collar 70.

In operation, clockwise rotation of cap 50 causes tubular shaft 54 to rotate. However, frictional forces between O-ring 96 of compression member 58 and inner surface 34 of tubular container 14 cause compression member 58 to resist rotation. Thus, the compression member 58 translates downwardly along tubular shaft 54 as tubular shaft 54 rotates. The downward translation of compression member 58 exerts a compressive force on the material disposed in containment region 100 of tubular container 14, forcing and/or extruding the material through apertures 86 of tubular shaft 54 and into fluid passage 76. Brush applicator 22 (or other implement) may be inserted into fluid passage 76 to extract a portion of the material contained in fluid passage 76 via a bristled end 104. Brush applicator 22 includes bristles 22' and also may include seal member 106 (e.g., an O-ring) disposed about a shaft of brush 22. Seal member 106 engages at least a portion of fluid passage 76 to prevent a loss of the material from fluid passage 76 or to prevent a drying of the material. Once the paste material forced into fluid passage 76 has been used, cap 50 is rotated again forcing additional material into fluid passage 76. This operation is repeatable until compression member 58 has substantially traversed the length of tubular shaft 54 (see FIG. 16).

Notably, the brush applicator 22 may include a shaft with different shapes. For example, the shaft may be configured to fit completely within a tubular shaft 54, or may include a large upper end that mates into the tapered surface 60 or that simply abuts same (with the O-ring 106 fitting into the inner region 76). Also, a magnet can be placed on a bottom of the container apparatus 10 so that the apparatus 10 can be securely placed on a metal object (such as a machine part or metal vehicle component) in order to prevent accidental tip-over and spillage during use.

To refill container apparatus 10, cap 50 is rotated in a counterclockwise direction (FIG. 16) causing compression member 58 to translate upwardly along tubular shaft 54 via the threaded connection until compression member 58 is positioned near cap 50. Piston assembly 18 is removed from tubular container 14 and additional material is added to tubular container 14. In lieu of removing piston assembly 18, the refill material may be injected into fluid passage 76. The injected refill material communicates through apertures 86 of tubular shaft 54 into containment region 100 to refill tubular container 14.

A modified container apparatus 120 (FIG. 17) for dispensing a paste onto threaded fasteners includes a container 121 adapted to hold a paste 122 (such as anti-seize paste compound) and to present same under the container's top for coating a shafted fastener. The container 121 includes an open top end defining an open area which receives a cup-defining top assembly 123 (FIG. 19), which includes a cup-defining top member 135 covered by a flexible layer 136 and a top plate 137. The top plate 137 and flexible layer 136 have one or more bolt-receiving applicator holes (three open applicator holes 124-126 being illustrated), each sized and adapted to closely receive a particularly-sized shaft of a fastener or bolt, such as threaded shaft 127 of fastener 128. Notably, more or less holes can be provided. The three illustrated holes 124-126 are different diameters, such that the apparatus is adapted to dispense paste 122 onto differently sized fasteners, such as hole 124 being for ¼-³⁄₁₆ inch diameter fasteners, hole 125 being for ⁵⁄₁₆-⅜ inch diameter fasteners, and hole 126 being for ½-⁷⁄₁₆ inch diameter fasteners.

A piston 130 (FIG. 17) is positioned in the container 121 and includes an O-ring seal 131 sealingly slideably engaging an inside surface of the container 121. A threaded center shaft 132 is fixed to and extends downward from a bottom of the cup-defining top member 135 and threads through the piston 130. The lower end of the illustrated shaft 132 abuts a bottom of the container 121, and can be rotatably attached to a bottom of the container. However, it is contemplated that a bottom of the shaft 132 can be constructed to engage the bottom of the container 121 in different configurations, such as by engaging a pocket in a bottom of the container. Further, it is contemplated that the shaft (132) does not have to hit the bottom at all, but needs only to extend sufficiently to always engage the piston 130 when the piston 130 is all the way down to its bottom position.

When the top assembly 123 (135/136/137) is rotated (for example, in a clockwise direction, FIG. 17), the shaft 132 rotates while the piston 130 resists rotation due to O-ring 131, causing the piston 130 to move vertically on the threaded shaft 132. For example, when the top assembly 123 is rotated clockwise (as viewed from above), it moves the paste 122 toward the top of the container 121. The reverse rotation causes the piston to move downwardly (such as when getting ready to refill the container). Notably, the seal 131 frictionally engages the wall of the container 121 when the assembly 123 is rotated, such that the piston 130 does not simply rotatingly spin as the top assembly 123 is rotated, but instead it threadingly "walks" up the threaded shaft. Thus, the paste 122 can be easily moved up to be against (or closely under) the application holes 124-126 without forcing the paste 122 out of the holes 124-126. In the illustrated arrangement, the O-ring seal 131 can be used to hold the assembly of components 123, 130, and 132 within the container 121. (i.e., It is contemplated that the fastener engaging a bottom of the shaft 132 through the bottom of the container 121 could be eliminated). It is also contemplated that a guide could be formed vertically along the container's wall and in the piston to more positively prevent rotation of the piston 130, but testing to date shows that the illustrated system does not require that.

It is contemplated that, if desired, the outer surface of the cup-defining top member 135 can include a circumferential channel for receiving an O-ring or gadget to sealingly engage the inside surface of the container 121. Also, it is contemplated that retainer screws or projections can be extended through the container 121 into a side-facing channel in the cup-defining top member 135, the purpose being for inner ends of the screws/projections to positively retain the top assembly 123 on the container 121 while allowing the top assembly 123 to be rotated in the container 121. However, testing to date suggests this is not necessary.

In top assembly 123 (FIG. 19), the cup-forming bottom member 135, the resilient layer 136, and the top plate 137 are secured together such as by screws 138 that extend through components 135-137, threading into the member 135. The illustrated cup-forming bottom member 135 includes a cup shaped portion that fits partially into the container 121 and forms a pocket at a top of the container 121 for holding an amount of the paste 122. The pocket helps keep the paste 122 fresh between uses (i.e., it reduces escape of volatiles), and helps keep the paste 122 that will not be used for some time (i.e., the paste 122 in a lower part of the container 121) in a more contained and separated area. It is contemplated that the cup-shaped portion may have a diameter close in size to the container 121 such that an O-ring seal 131 is not required, or alternatively may include an O-ring seal 131 that prevents leakage of paste 122 between the top member 135 and the container 121. Nonetheless, it is noted that the present arrangement does not place the paste 122 in compression, so there is minimal reason to generate leakage. Notably, holes 135' and/or 135" (FIG. 17) extend through a bottom of the cup-shaped portion and/or through the center shaft 132 to allow paste 122 to flow from the lower portion of the container 121 into the cup-shaped portion of the cup-forming top member 135 when the top assembly 123 (i.e., shaft 132) is rotated to cause the piston 130 to move upwardly.

The components 136-137 include aligned holes 124' and 124" (FIG. 20) that form the application hole 124, with the hole 124' in the resilient layer 136 being slightly smaller than the aligned hole 124" in the top plate 137. (The specific undersized amount of the smaller hole will depend on the material being dispensed, characteristics of the flexible layer, and other functional and user preferences.) The slightly smaller size of the hole in the resilient layer 136 allows marginal material of the resilient layer 136 around the hole 124 to act as a flexible wiper, thus wiping excess paste 122 off of the threaded shaft 127 from the fastener 128 as the fastener 128 is removed. By this arrangement, the remaining paste 122 left on the shaft 127 (see FIG. 17) has a limited thickness filling the space between the threads and having a thickness dimension about equal to the threads of the fastener 128, yet the paste 122 is very uniformly distributed. Thus, by this arrangement, the threaded shaft 127 of the fastener 128 can be extended through the application hole 124 and be covered with the paste 122. When removed, the resilient layer 136 wipes off excess paste 122 from the shaft 127, leaving a layer of paste 122 of limited thickness on the threaded shaft 127. Thus, a minimum amount of the paste 122 is applied, yet it is applied very uniformly, cleanly, and completely onto the desired surface area of the threaded shaft 127.

In the present arrangement of FIGS. 17-21, the holes in the resilient layer are smaller than the aligned holes in the rigid metal parts of the top member 123 so that wipers are formed with adequate length to properly function and "wipe along" threads on the threaded shaft of the fastener. Also, the difference in sizes is such that the wiper portion is not sheared off as a fastener is extended through the hole and into the paste. For example, the illustrated resilient layer 136 can be made of a rubber material that is about ¹⁄₁₆" thick or slightly less, and would have a hole 124' of about ⅛ inch diameter, while the hole 124" would have a ⁵⁄₁₆" diameter hole for receiving a bolt of about ¼" to ³⁄₁₆" diameter. This allows the marginal material in the resilient layer 136 to flex and form a wiper that extends partially along the shaft 137 as the fastener 128 is pressed into and then pulled out of the paste 122. Notably, in FIG. 17, the resilient layer 136 includes an edge located between the container 121 and the top plate at a place where it can affect the force required to rotate the top assembly 123, if so desired.

It is contemplated that the container apparatus 120 further can include a lid/cover 140 (FIG. 20) with lip 141 shaped to sealingly cover a top of the container apparatus 120. By covering the container 121, the paste-access holes 124, 125, 126 are covered, which prevents volatiles from escaping from the paste 122 and also prevents debris from entering the paste 122 through any of the paste-access holes 124, 125, 126. The illustrated cover 140 (FIG. 20A) includes a downwardly-facing recess formed by a top 140' and a circumferential lip 141. The lip 141 can be designed to sealingly engage an outer edge of the resilient layer 136 to create a sealed engagement. Alternatively, a cover 140' (FIG. 20A) can include an O-ring seal similar to the O-ring 145B (FIG. 21A) positioned either in the underside surface of lip 141 in a position to both hold the cover 140 on the container 121 and also provide the sealing engagement. A small air relief hole can be provided through the lip 141 if such high vacuum is created preventing easy removal of the cover 140.

Figures 20, 20A:
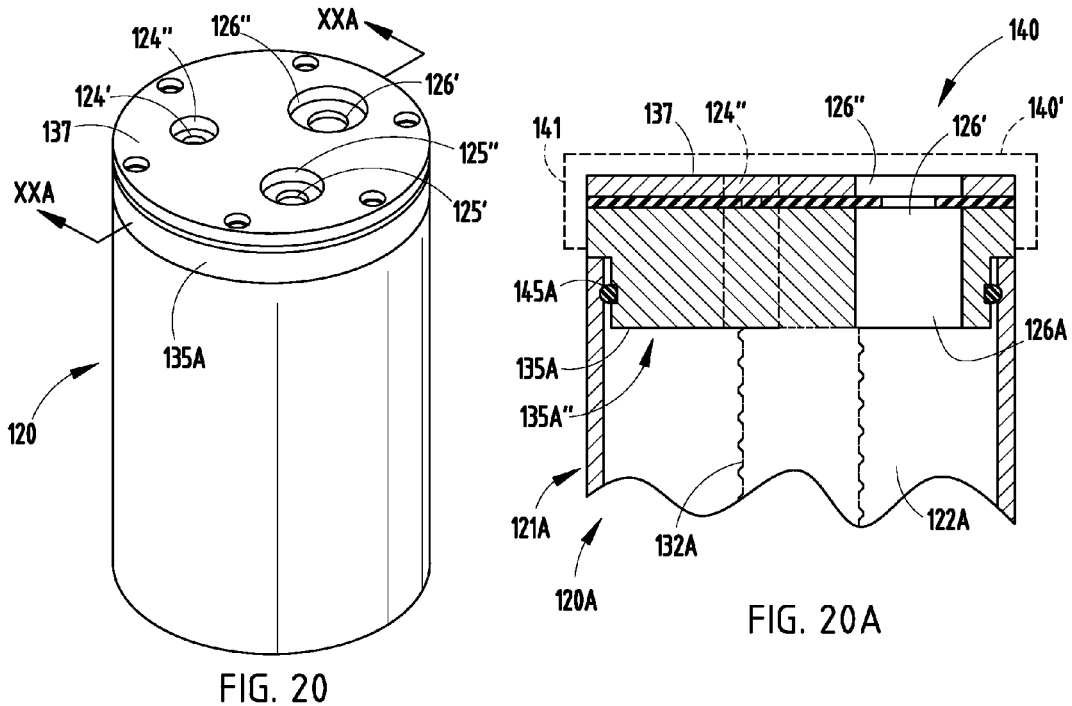
FIG. 20 is a perspective view of a modified version of FIG. 17.
FIG. 20A is a cross section along line XXA-XXA.

It is contemplated that modifications can be made to the present apparatus. For example, FIG. 20A shows a modified container apparatus 120A where the top member 135A is modified to eliminate the cup-forming area. The bolt-receiving holes 124A-126A extend straight through into the paste-containing area immediately above the piston. Also, a groove is formed so that an O-ring 145A fits between the top member 135A and the container 121A to sealingly engage same. Specifically, in FIG. 20A, the bottom member 135A of top assembly 123A includes a center portion 135A" that is sufficient in depth to extend into the container 121A. An O-ring seal 145A on the outer surface of the bottom member 135A engages the inner surface of the container 121A. The O-ring seal 145A may be important to reduce loss of volatiles in the paste 122A due to the short distance of adjacent surfaces between the top assembly and the container 121A. As noted, in the arrangement of FIG. 20A, the application holes 124A-126A extend through the bottom member 135A directly into a main portion of the container 121A, the piston (130) being below the paste.

Figures 21, 21A:
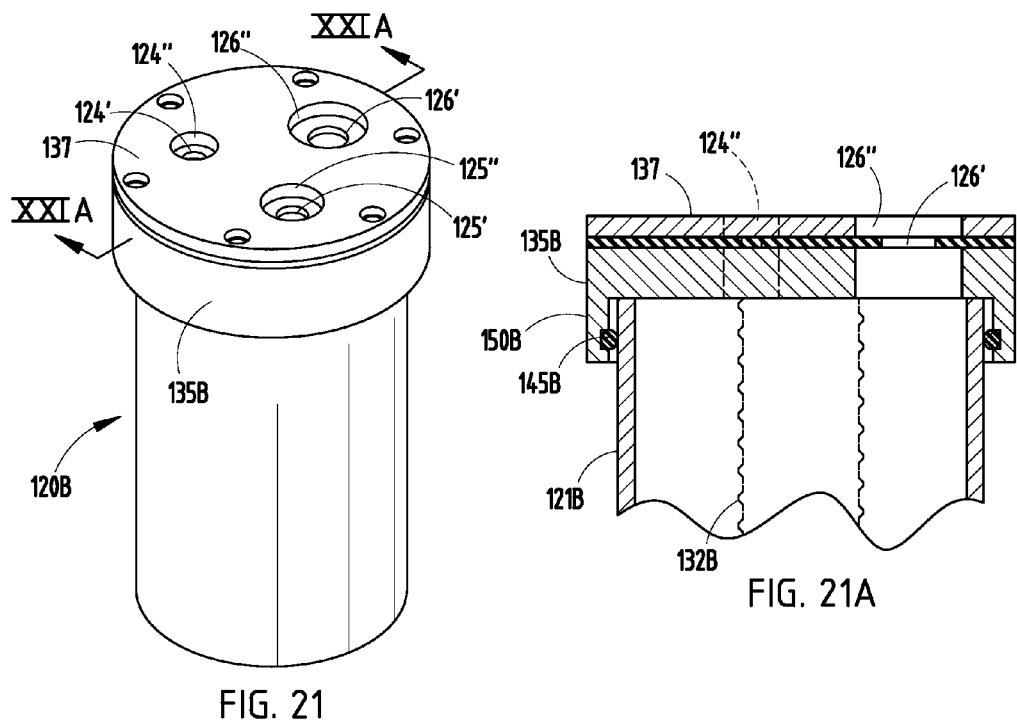
FIG. 21 is a perspective view of another modified version of FIG. 17.
FIG. 21A is a cross section along line XXIA-XXIA.

The container apparatus 120B of FIG. 21 is similar to FIG. 20A, but in FIG. 21, the top member 135B includes an outer circumferential lip 150B that extends downwardly around an outside of the top of the container 121B. The O-ring seal 145B is located between the lip 150B and the container 121B on an outboard side of the container 121B. The center shaft 132B extends from the bottom member 135B as in previous descriptions above. Notably, in FIGS. 20A, 21, 21A, the resilient layer is located at a place where it does not affect the force required to rotate the top assembly 123B. Notably, in the illustrated arrangement, a breather hole is included in a bottom of the container to prevent a vacuum as the piston is raised. The breather hole can be in a side or bottom of the container.

Figure 22:
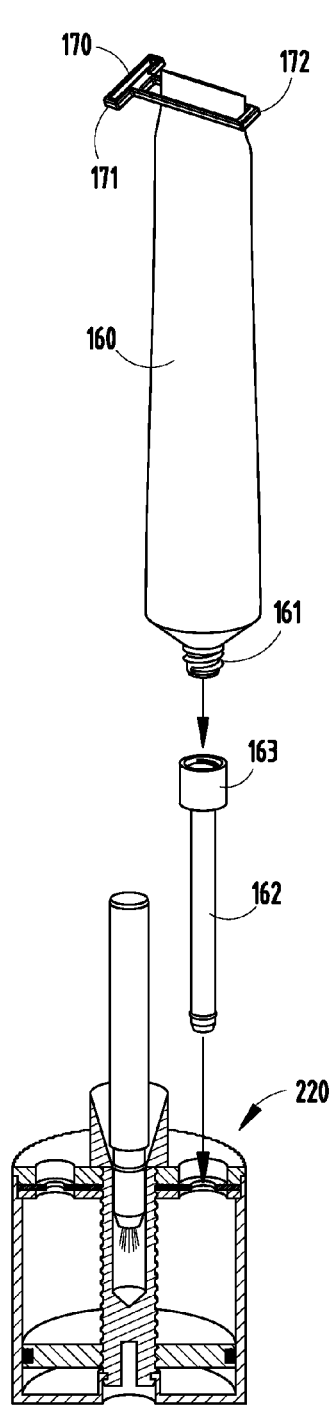
FIGS. 22-23 are perspective views showing a refill system for the present apparatus, FIG. 22 being exploded apart, FIG. 23 being enlarged and placed together.
Figure 23:
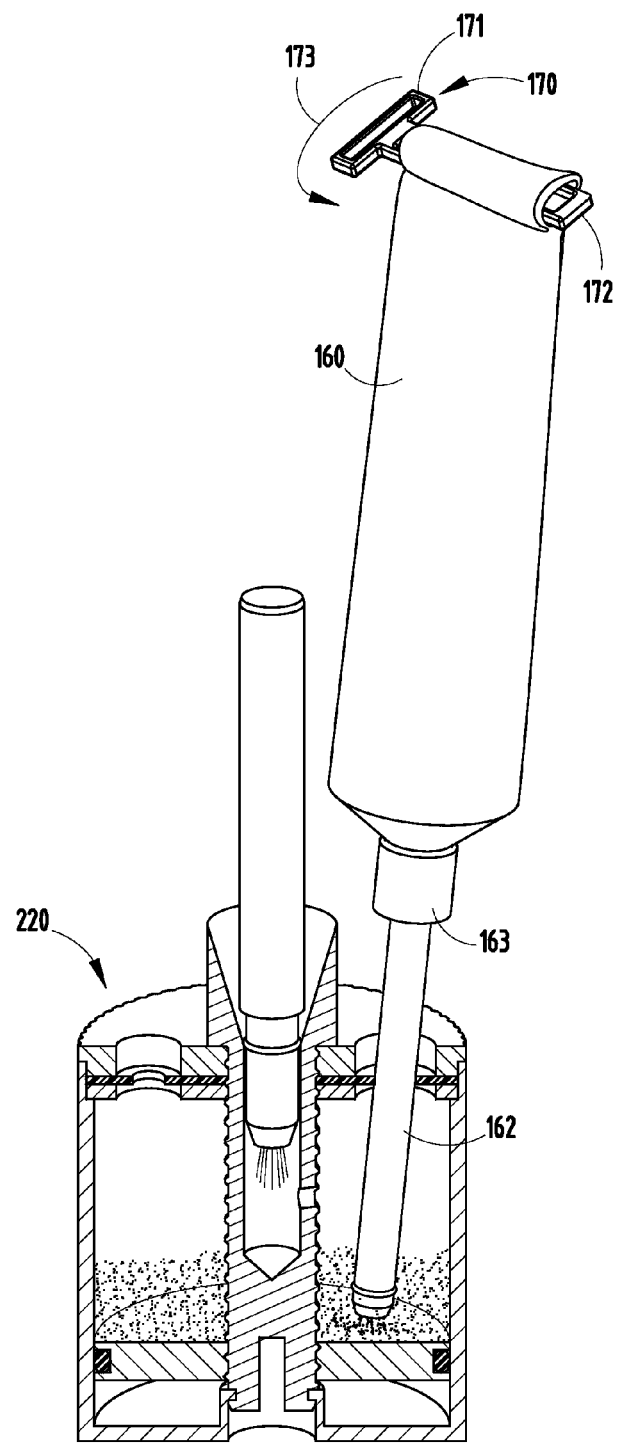

FIGS. 22-23 illustrate a filling system including a flexible tube of paste 160 (filled with replacement paste for filling the container, such as anti-seize paste, or toothpaste, or other paste) with a male threaded end 161, and an elongated filler tube 162 with a female end 163 for threadably engaging the male threaded end 161. The filler tube has tube section 164 with a length and size sufficient to extend through one of the dispensing holes in the container and to extend to a bottom of the container so that refill paste material squeezed from the flexible tube is deposited near a bottom of the container.

FIG. 23 is a perspective view showing the flexible tube 160 of paste attached to the fill tube 162, with the fill tube 162 positioned with its tube section 164 extending through hole 124 in the apparatus 120 into the container 121. A T-shaped winding tool 170 works particularly well for winding up flexible tube 160. The tool 170 includes a transverse handle 171 and finger 172 that extend perpendicular to handle 171 and that define a slot therebetween for receiving the free end of the flexible tube 160. The flexible tube 160 is not unlike a tube of tooth paste. By rotating the handle 171 in direction 173, the flexible tube 160 winds up from its free end toward its threaded end 161. Due to the way that this works mechanically and compressively from the free end of the flexible tube 160, this action advantageously and very efficiently squeezes almost all of the paste 122 from the paste-filled flexible tube 160 into the container 121.

Thus, a container apparatus for dispensing a paste onto a fastener includes a container adapted to hold a paste and including an open top, and a top member on the container including paste-access holes and a resilient wiper with a flexible wiping edge for wiping excess material from a fastener as the fastener is removed from one of the paste-access holes after dipping into the paste to keep the excess material in the container. By this arrangement, the shaft of the fastener can be extended into the paste and be covered with the paste and, when removed, a layer of the paste of limited thickness is left on the shaft. In one form, the wiping edge is part of a resilient layer forming part of the top member and includes marginal material forming a flexible wiper(s) around a hole(s) in a rigid plate part of the top member.

Also, a method of applying paste to a threaded shaft of a fastener comprises steps of: providing a container holding paste and including an open top; and providing a top member for covering the container, the top member having a paste-access hole sized and being adapted to closely receive the threaded shaft of a fastener. The method further includes extending the threaded shaft of the fastener through the hole and into the paste to thus cover a portion of the threaded shaft with the paste, and then removing the threaded shaft such that, when removed, a layer of paste of limited thickness remains on the threaded shaft.

Also, a method of applying a paste to a shaft of a fastener comprises steps of providing a container holding paste and including a top, providing a top member for partially covering the container, the top member including a flexible wiper, and dipping the fastener into the paste and then wiping excess material from a shaft of the fastener on the wiper to thus leave a layer of paste of limited thickness remaining on the shaft.

It is contemplated that a wide variety of different pastes and viscous materials can be handled by the present apparatus and system, including anti-seize pastes and compounds, greases, lubricants, thick and/or viscous materials such as plumber's putty, and also non-toxic items such as tooth paste.

Combination Container Apparatus

A container apparatus 220 (FIGS. 1-13) combines concepts in the brush-type container apparatus 10 with concepts in the bolt-covering-type container apparatus 120, and further integrates a twist-close feature for closing bolt-receiving holes such that a separate cover is not necessary to eliminate loss of volatiles from the paste.

The modified container apparatus 220 (FIGS. 1-8) for dispensing a paste onto threaded fasteners includes a container 221 adapted to hold a paste 222 (such as anti-seize paste compound) and to present same for coating a shafted fastener and/or for coating the brush end of a brush applicator. The container 221 includes a top end defining an open area which receives a top assembly 223. The top assembly 223 includes a top plate (top member) 237, a wipe-forming flexible layer 236, and a wiper retainer 236'. The top plate 237, flexible layer 236, and retainer 236' have one or more bolt-receiving paste-access holes (four outer differently-sized paste-access holes including holes 224, 224A, 225, 226 being illustrated), each sized and adapted to closely receive a particularly-sized shaft of a fastener or bolt, such as threaded shaft 227 of fastener 228. It is contemplated that more or less paste-access holes can be provided, and that different diameters can be provided. The illustrated hole 224 is for ¼-³⁄₁₆ inch diameter fasteners, hole 225 is for ⁵⁄₁₆-⅜ inch diameter fasteners, and hole 226 being for ½-⁷⁄₁₆ inch diameter fasteners. The flexible layer 236 defines holes that align with holes 224-226, but which are slightly smaller in size such that the flexible layer 236 acts as a wiper at each hole location, thus preventing excess paste from remaining on the shafts as the fasteners are pulled out of the holes.

A piston 230 (FIGS. 7-8) is positioned in the container 221 and includes an O-ring seal 231 in an annular groove for sealingly slideably engaging an inside surface of the container 221. A tubular center shaft member 232 is threaded into, fixed to and extends downward from a bottom of the top member 235 and includes threads that threadably engage a center of the piston 230. (Shaft member 232 is not unlike shaft 50 and 132 described above.) The lower end of the illustrated shaft member 232 abuts a bottom of the container 221, and can be rotatably attached to a bottom of the container such as by an inwardly-formed annular lip 221' (FIG. 7) on the container 221 that engages an annular channel near a bottom of the shaft member 232. A screw can be used to secure the shaft member 232 to a center of the container's bottom, if desired. (See potential screw location 221" in FIG. 7. See also FIGS. 7A-7C, 15, 17, and/or 22 for other configurations.)

Handled applicator 240 (FIGS. 6-7) includes a handle-forming end 241 and an applicator brush end including bristles 242. Applicator 240 is shaped to fit closely into the center paste-access hole 232' of the tubular shaft 232. Various configurations are contemplated. The illustrated applicator 240 includes an O ring seal 243 for sealingly engaging an inner surface of the tubular shaft 232. Also, a middle portion of the applicator (i.e., between a lower end of the handle 241 and above the bristles 242 has a frusto-conical shape adapted to snugly engage a mating frustoconical shape at a top of the bore in tubular shaft 232.

As noted above, the top assembly 223 includes a top plate (top member) 237, a wipe-forming flexible layer 236, and a wiper retainer 236'. The illustrated top plate 237 (FIGS. 3-3C) includes two arcuate slots 245 on its bottom surface, and the wiper retainer 236' includes a pair of protrusions 246 that fit into the slots 245. When rotated to an open position (see FIGS. 3B, 3C), the protrusions 246 engage a first end of the slots 245 which locates the components 236, 236' and 237 so that the holes in each of components 236, 236' and 237 align. When rotated to a closed position (see FIGS. 3, 3A), the protrusions 246 engage a second end of the slots 245 so that the holes in components 236 and 237 misalign and the holes are thus closed. The protrusions 246 extend through holes in the flexible layer 236 such that the flexible layer 236 moves simultaneous with the wiper retainer 236'. By this arrangement, the holes 224, 224A, 225, 226 can be selectively closed (so that volatiles do not evaporate and also so that dirt and debris do not fall into the holes 224-226 during non-use) and selectively opened (so that the holes 224-226 can be accessed by fasteners for coating their threads).

Notably, in the tubular shaft 232 is not unlike the shaft 50 (FIG. 14B), but the tubular shaft 232 includes a radial passageway 250 (similar to hole 86 in tubular shaft 54, FIG. 14B) that allows paste to move into the hole 232' within the tubular shaft 232. Unlike hole 86 in shaft 54, the radial passageway 250 on tubular shaft 232 is located on the shaft so that paste material can flow from above the piston 230 into a middle of the hole 232'. By keeping the paste on a top of the piston 230, adjustment of the piston causes the paste to move toward the holes 224-226 and also to move into the hole 232' in tubular shaft 232, thus refilling (replenishing) the paste in both locations.

Figure 2:
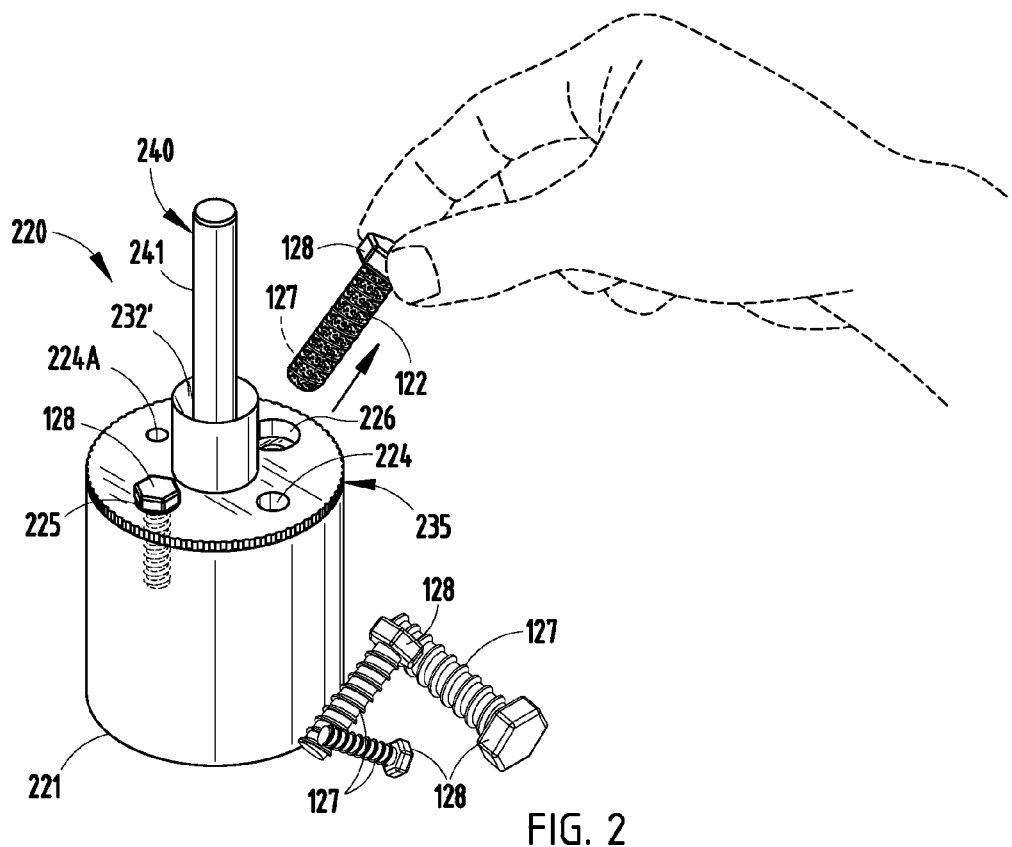
Figure 6:
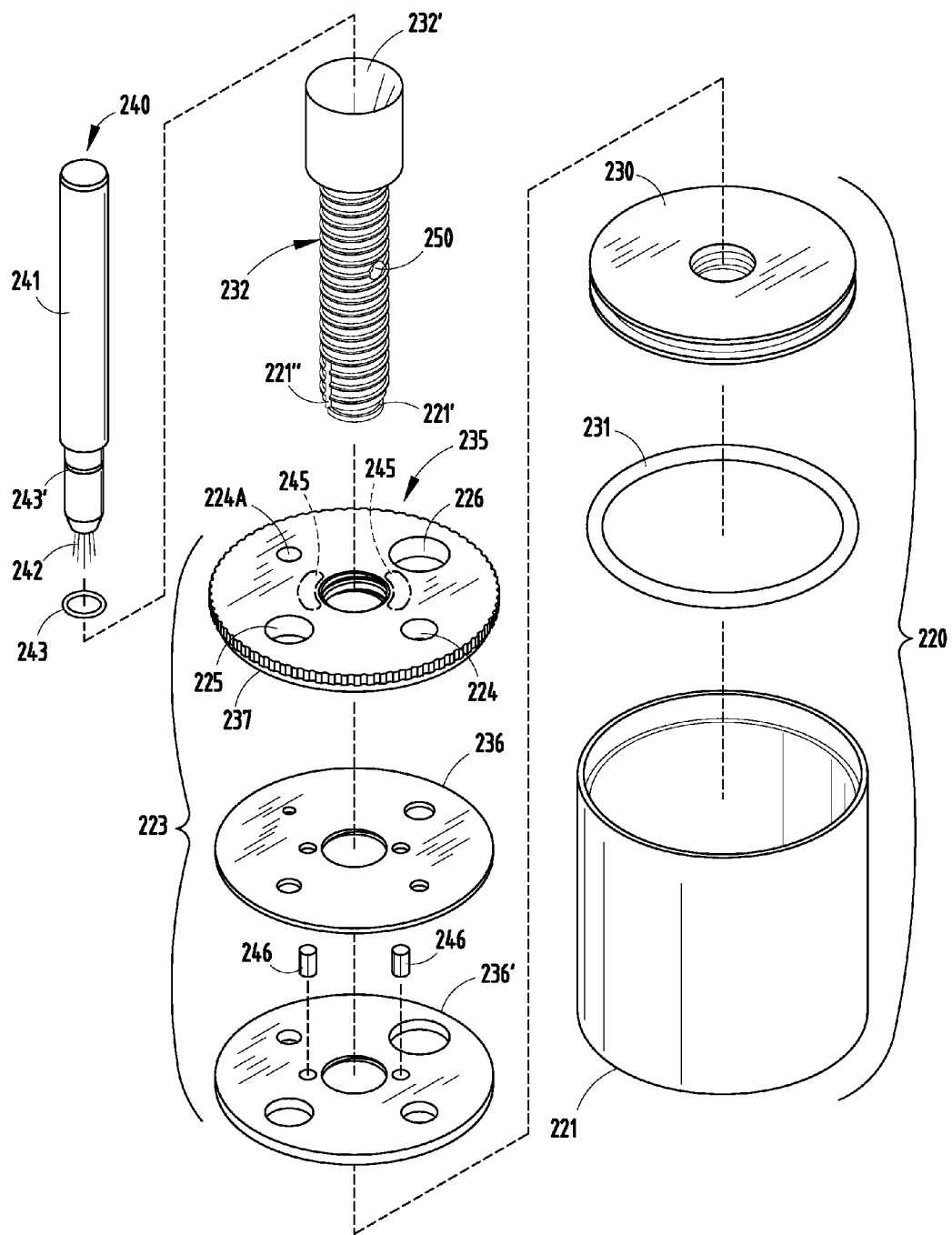
FIG. 6 is an exploded perspective view of the present apparatus.
Figure 7:
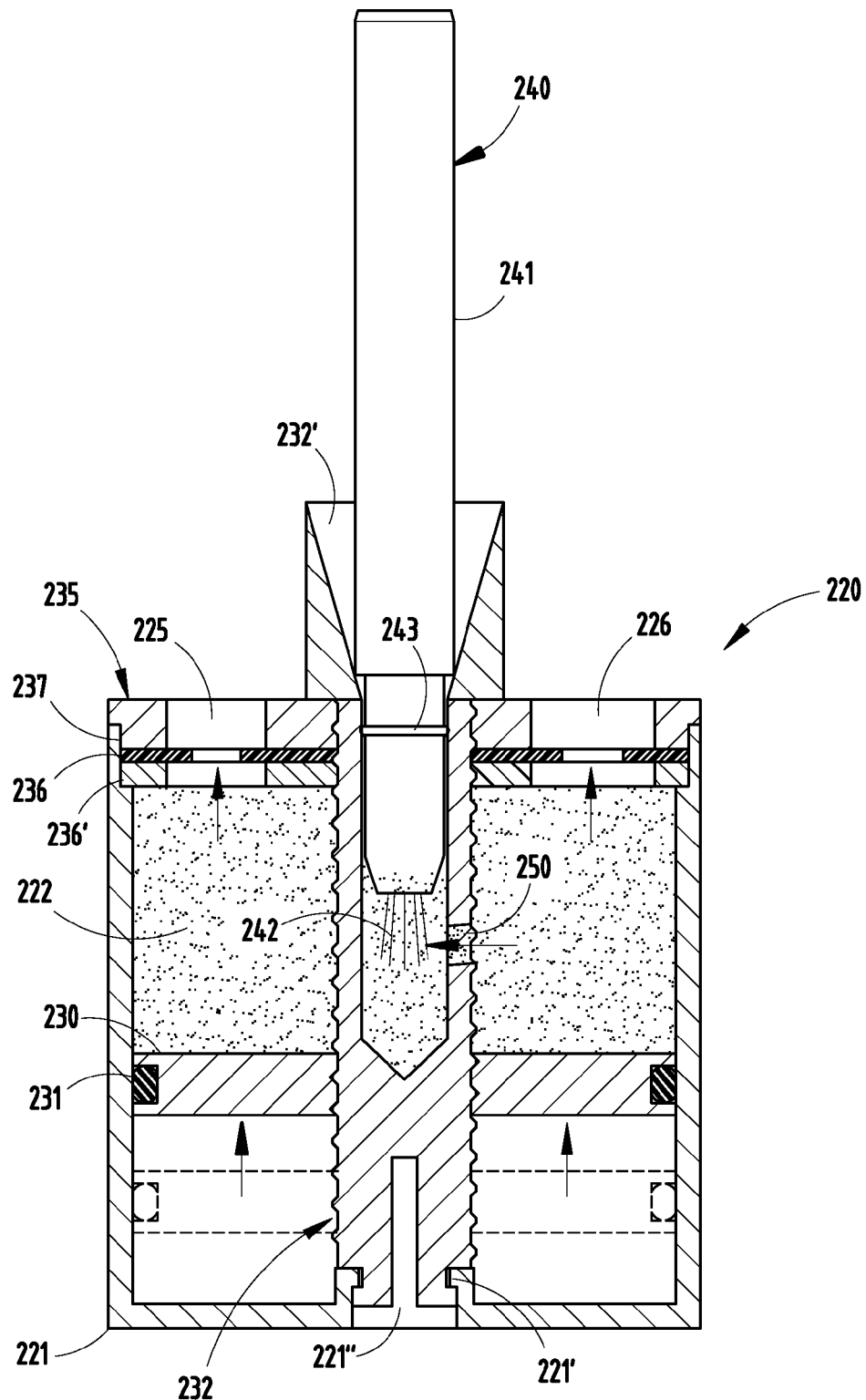
FIG. 7 is a cross-sectional view of FIG. 1, and FIGS. 7A-7C are modified configurations.
Figure 7A:
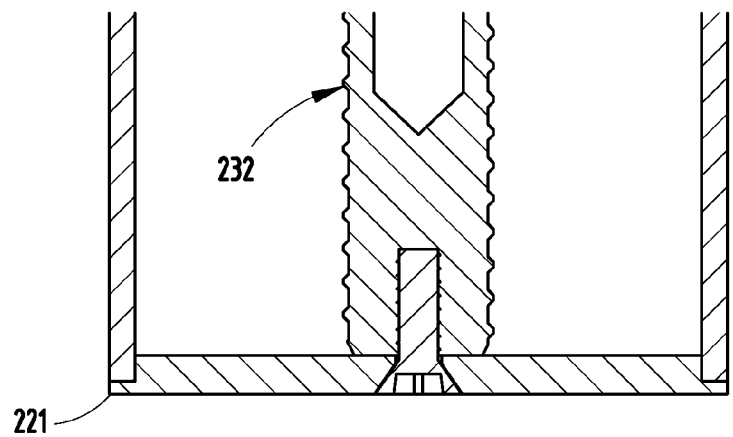
Figure 7B:
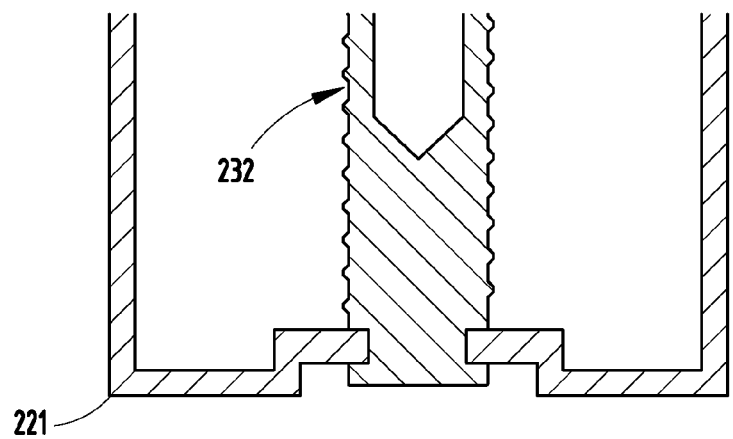
Figure 7C:
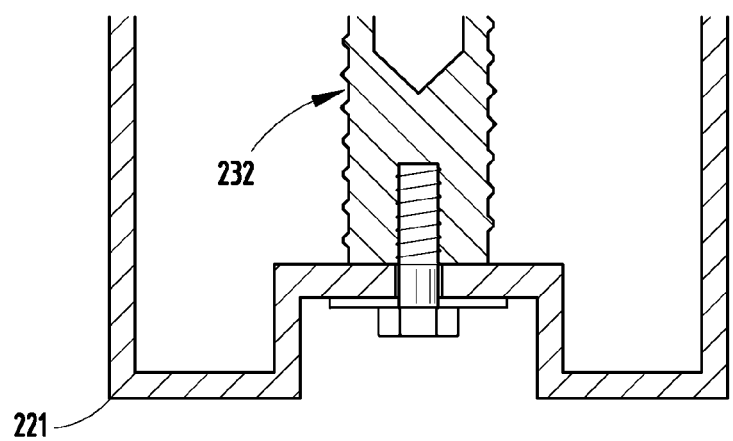
Figure 8:
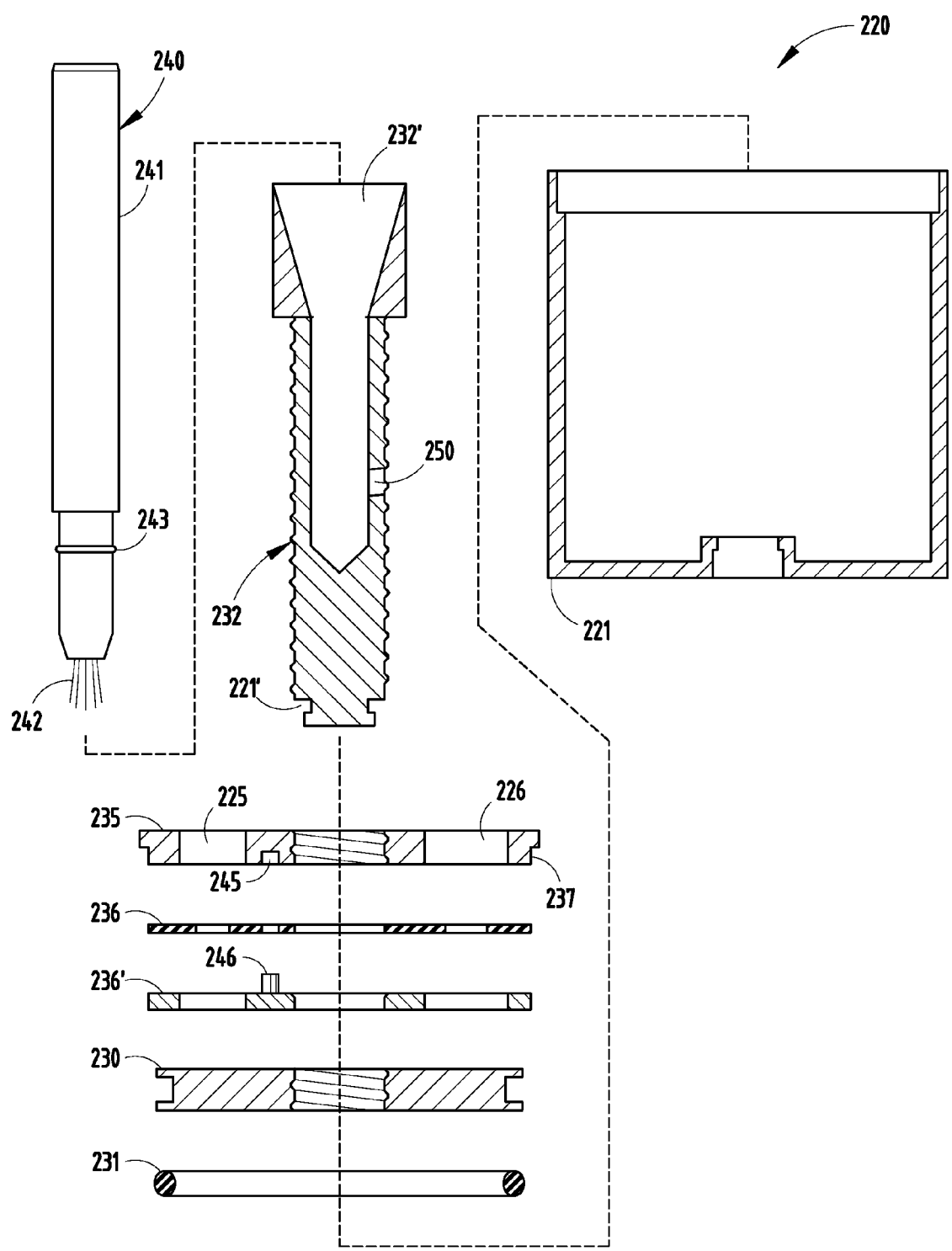
FIG. 8 is an exploded cross-sectional view of FIG. 7.
Figure 9:
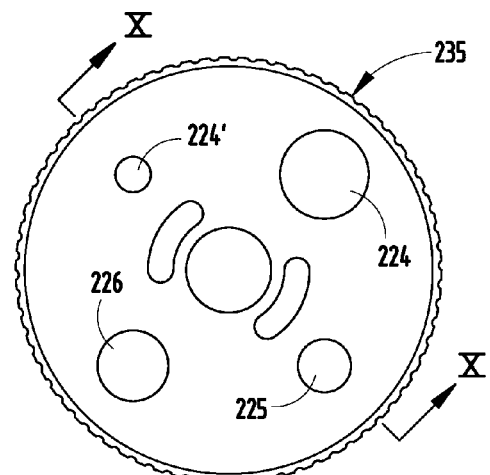
FIG. 9 is a bottom view of the top member in FIG. 8.
Figure 11:
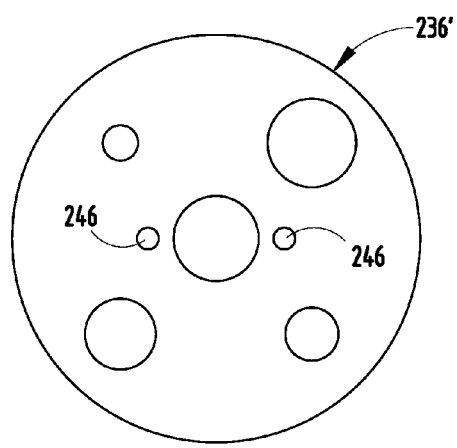
FIG. 11 is a top view of the retainer member in FIG. 8.
Figure 10:
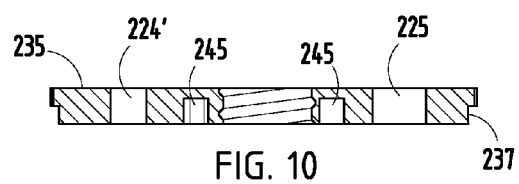
FIG. 10 is a cross section along line X-X in FIG. 9.
Figure 12:
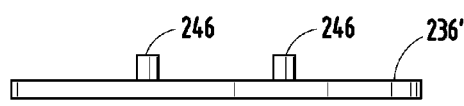
FIG. 12 is a side view of FIG. 11.
Figure 13:
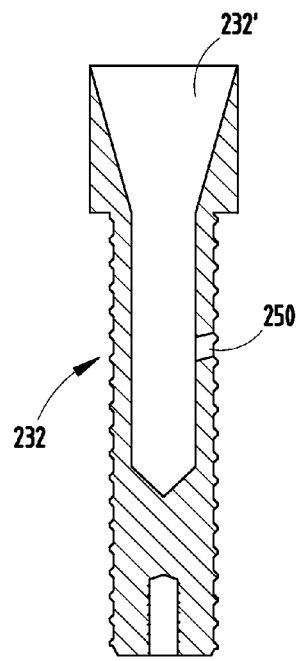
FIG. 13 is a side view, showing a longitudinal cross section of the shaft in FIG. 8.

As noted above, when top member 235 is gripped to rotate the top assembly 223 (235/236/236') and then rotated a short distance (for example, about 30 to 45 degrees in a clockwise direction, compare FIGS. 2-3), the top member 235 rotates while the flexible layer 236 and the retainer 236' do not. This dissimilar movement causes the holes in retainer 236' to misalign with the paste-access holes 224-226 in the top member 235 . . . which closes (i.e., sealingly covers) the paste-access holes 224-226. This short dissimilar movement of the top member 235 to the retainer 236' (and flexible layer 236) is controlled by short arcuate grooves 245 on a bottom of the top member 235 which are engaged by protruding pins 246 on the retainer 236'. The pins 246 extend through mating holes in the flexible layer 236 and fit into the grooves 279. During the movement along path (i.e., the 30-45 degrees), the pins 246 move between ends of the grooves 245. Once the pins 246 bottom out on an end of the grooves 245 and the top assembly 223 is further rotated, the shaft 232 rotates while the piston 230 resists rotation due to O-ring 231. This causes the piston 230 to move vertically on the threaded shaft 232. For example, when the top assembly 223 is rotated clockwise (as viewed from above), it moves the paste 222 toward the top of the container 221, causing the paste to move close toward the holes 224-226 and also causing paste to flow into the paste-access hole occupied by the bristled end of the brush applicator. The reverse rotation causes the piston to move downwardly (such as when getting ready to refill the container). Notably, the seal 231 frictionally engages the wall of the container 221 when the assembly 223 is rotated, such that the piston 230 does not simply rotatingly spin as the top assembly 223 is rotated, but instead it threadingly "walks" up the threaded shaft. Thus, the paste 222 can be easily moved up to be up against (or closely under) the application holes 224-226 without forcing the paste 222 out of the holes 224-226.

In one alternative, it is contemplated that an apparatus similar to apparatus 10, 120, or 220) can include a single top paste-access hole in its tubular shaft that is shaped to removably receive a brush applicator and further, when the applicator is removed, is shaped to receive a shaft of a threaded fastener for coating the shaft with a thin layer of paste material.

The foregoing description merely explains and illustrates the invention. The invention is not limited thereto, except insofar as the appended claims are so limited, since people skilled in this art who have the disclosure before them will be able to make modifications without departing from the scope of the invention.

What is claimed is:

1. A container apparatus for dispensing a lubricious material, comprising:
   a tubular container including a bottom;

a top assembly including a resilient layer having at least one resilient layer paste-access hole, a wiper retainer having at least one wiper retainer paste-access hole, and a top plate having at least one top plate paste-access hole, wherein the top plate is rotatably attached to the tubular container and wherein turning of the top plate with respect to the resilient layer changes an alignment of the at least one top plate paste-access hole with respect to the at least one resilient layer paste-access hole and the at least one wiper retainer paste-access hole, wherein the at least one resilient layer paste-access hole includes a radius that is smaller than the at least one wiper retainer paste-access hole and the at least one top plate paste-access hole, wherein a radius of the at least one resilient layer paste-access hole is smaller than a radius of an associated fastener;

a tubular shaft connected to the top plate and having threads around an outer surface; and a piston plate for motivating paste within the tubular container toward the top plate, wherein the piston plate includes an outer surface positioned adjacent an inner surface of the tubular container and a hole in a center portion having mating threads that engage the tubular shaft threads such that rotation of the tubular shaft moves the piston plate vertically within the tubular container to motivate the lubricious material within the tubular container toward the top assembly.

2. The container apparatus of claim 1, wherein a partial turn of the top plate aligns the at least one top plate paste-access hole with respect to the at least one resilient layer paste-access hole and a further turn of the top plate encourages lubricious material toward the top plate.

3. The container apparatus of claim 1, wherein a partial turn of the top plate misaligns the at least one top plate paste-access hole with respect to the at least one resilient layer paste-access hole.

4. The container apparatus of claim 1, wherein the top plate includes a plurality of top plate paste-access holes and the resilient layer includes a plurality of resilient layer paste-access holes, wherein each top plate paste-access hole and each resilient layer paste-access hole having a different diameter and adapted to receive a threaded fastener with a different shaft size and wherein each top plate paste-access hole alignable with a corresponding resilient layer paste-access hole.

5. The container apparatus of claim 1, including a resilient wiper extending radially inward from a margin of the at least one top plate paste-access hole.

6. The container apparatus of claim 1, wherein when the at least one top plate paste-access hole is aligned with the at least one resilient layer paste-access hole, a wiper portion of the resilient layer extends radially inward with respect to a margin of the at least one top plate paste-access hole and wipes excess paste from items extended through the at least one top plate paste-access hole and the at least one resilient layer paste-access hole.

7. The container apparatus of claim 1, wherein the resilient layer includes a resilient wiper extending inward from a margin of the at least one top plate paste-access hole adapted to leave a limited thickness of lubricious material covering at least a portion of the threads on the tubular shaft.

8. The container apparatus of claim 1, wherein the at least one resilient layer paste-access hole defines a wiper around the paste-access hole.

9. A lubricious material dispenser, comprising:

a substantially cylindrically shaped tubular container including a bottom; and a top assembly including a resilient layer having at least one resilient layer paste-access hole and a top plate rotatably supported on an end of the substantially cylindrically shaped tubular container opposite the bottom and having at least one top plate paste-access hole, wherein the top plate is rotatably supported on the substantially cylindrically shaped tubular container and wherein a turn of the top plate with respect to the resilient layer changes an alignment of the at least one top plate paste-access hole with respect to the at least one resilient layer paste-access hole, wherein when the at least one top plate paste-access hole is aligned with the at least one resilient layer paste-access hole, a portion of the resilient layer extends radially inward with respect to a margin of the at least one top plate paste-access hole and wipes excess paste from items extended through the at least one top plate paste-access hole and the at least one resilient layer paste-access hole, wherein a radius of the at least one resilient layer paste-access hole is smaller than a radius of an associated fastener, and wherein marginal material in the resilient layer flexes to form a wiper that wraps around a shaft of the fastener as the fastener is pressed into and/or pulled out of the resilient layer paste-access hole.

10. The dispenser of claim 9, further comprising:

a tubular shaft connected to the top plate and having threads around an outer surface; and a piston plate for motivating paste within the tubular container toward the top plate, wherein the piston plate includes an outer surface positioned adjacent an inner surface of the tubular container and a hole in a center portion having mating threads that engage the tubular shaft threads such that rotation of the tubular shaft moves the piston plate vertically within the tubular container to motivate the lubricious material within the tubular container toward the top assembly.

11. The dispenser of claim 10, wherein a partial turn of the top plate aligns the at least one top plate paste-access hole with respect to the at least one resilient layer paste-access hole and a further turn of the top plate encourages lubricious material toward the top plate.

12. The dispenser of claim 10, wherein a partial turn of the top plate misaligns the at least one top plate paste-access hole with respect to the at least one resilient layer paste-access hole.

13. The dispenser of claim 9, wherein the top plate includes a plurality of top plate paste-access holes and the resilient layer includes a plurality of resilient layer paste-access holes, wherein each top plate paste-access hole and each resilient layer paste-access hole having a different diameter and adapted to receive a threaded fastener with different shaft size and wherein each top plate paste-access hole aligns with a corresponding resilient layer paste-access hole prior to the partial turn of the top plate with respect to the resilient layer.

14. The dispenser of claim 9, wherein the at least one resilient layer paste-access hole has a radius less than a radius of the at least one top plate paste-access hole.

15. A lubricious material container, comprising:

a substantially cylindrically shaped tubular container including a bottom; and a top assembly including a resilient layer having at least one resilient layer paste-access hole and a top plate rotatably supported on an end of the substantially cylindrically shaped tubular container opposite the bottom and having at least one top plate paste-access hole, wherein the top plate is rotatably supported on the substantially cylindrically shaped tubular container and wherein a turn of the top plate with respect to the resilient layer changes an alignment of the at least one top plate paste-access hole with respect to the at least one resilient layer paste-access hole, wherein the at least one resilient layer paste-access hole has a radius less than a radius of the at least one top plate paste-access hole such that the resilient layer acts as a wiper around the paste-access hole, wherein a radius of the at least one resilient layer paste-access hole is smaller than a radius of an associated fastener, and wherein marginal material in the resilient layer flexes to form a wiper that wraps around a shaft of the fastener as the fastener is pressed into and/or pulled out of the resilient layer paste-access hole.

16. The container of claim 15, further comprising:
a tubular shaft connected to the top plate and having threads around an outer surface; and
a piston plate for motivating paste within the tubular container toward the top plate, wherein the piston plate includes an outer surface positioned adjacent an inner surface of the tubular container and a hole in a center portion having mating threads that engage the tubular shaft threads such that rotation of the tubular shaft moves the piston plate vertically within the tubular container to motivate the lubricious material within the tubular container toward the top assembly.

17. The container of claim 16, wherein a partial turn of the top plate aligns the at least one top plate paste-access hole with respect to the at least one resilient layer paste-access hole and a further turn of the top plate encourages lubricious material toward the top plate.

18. The container of claim 16, wherein a partial turn of the top plate misaligns the at least one top plate paste-access hole with respect to the at least one resilient layer paste-access hole.

19. The container of claim 15, wherein the top plate includes a plurality of top plate paste-access holes and the resilient layer includes a plurality of resilient layer paste-access holes, wherein each top plate paste-access hole and each resilient layer paste-access hole having a different diameter and adapted to receive a threaded fastener with different shaft size and wherein each top plate paste-access hole aligns with a corresponding resilient layer paste-access hole prior to the partial turn of the top plate with respect to the resilient layer.

20. The container of claim 19, wherein each resilient layer paste-access hole has a radius less than a radius of the corresponding top plate paste-access hole.

* * * * *